United States Patent [19]

Stevenson

[11] 4,208,123
[45] Jun. 17, 1980

[54] PHOTO GRAPHIC-PLANE

[76] Inventor: Stanley W. Stevenson, 3054 W. 4325 South, Roy, Utah 84067

[21] Appl. No.: 928,541

[22] Filed: Jul. 27, 1978

[51] Int. Cl.² .................... G03B 27/32; G03B 27/62
[52] U.S. Cl. ............................................ 355/25; 355/76
[58] Field of Search ..................... 355/75, 76, 25, 82, 355/91–94

[56] References Cited

U.S. PATENT DOCUMENTS

| | | | |
|---|---|---|---|
| 978,719 | 12/1910 | Ellis | 355/25 |
| 1,780,701 | 11/1930 | Crane | 355/92 |
| 2,134,704 | 11/1938 | Cornell | 355/82 |
| 2,184,012 | 12/1939 | Hopkins | 355/25 |
| 2,652,757 | 9/1953 | Robbins | 355/92 |

*Primary Examiner*—Donald A. Griffin

[57] ABSTRACT

Photo Graphic-Plane is a system that will facilitate the photographic process. It is a pneumatic device designed to support books and volumes at a level plane with minimum curvature of the surface while being microfilmed or photo-copied. This objective is accomplished thru air displacement from one collapsible and inflatable container under one cover of the volume thru a by-pass tube and control valve into another collapsible and inflatable container under the other cover of the volume. The result is an automatic leveling effect as pages are turned, causing an inverse shift of weight which in turn causes air displacement and the leveling process. A transparent cover is provided for the surface being photographed to enhance the leveling of the volume while reducing the surface curvature to near zero. The transparent cover is hinged to a base thru a novel coupling of fabric or magnetic force which permits flexibility in adjustment or removal and especially to allow the transparent cover to be elevated or lowered at its level plane thereby accommodating thick or thin volumes. The transparent cover is raised and lowered on the coupling which also functions as a hinge to permit pages to be turned and photographed.

4 Claims, 6 Drawing Figures

PHOTO GRAPHIC-PLANE

BACKGROUND OF THE INVENTION

This invention generally relates to photography and the need in that industry for a level or horizontal photographic surface with zero curvature. More particularly, this invention relates to microfilming where the stated need is critical. Specifically, this invention provides an automatic system for leveling books, volumes or otherwise unmanageable documents, for holding such objects being photographed at a level plane and at near zero curvature.

Current practice is generally limited to the use of props, boards, wedges or clips to accomplish the leveling or curvature problems. This archaic method does not contribute to quality or production and lacks precision in providing a level surface free of curvature. Furthermore, production is impeded by continual shifting and changing of the props, wedges and clips by the operator.

The device of this invention presents the industry with a system that uses air as the leveling agent and a transparent cover for the material being photographed, to enhance the leveling effect and reduce the curvature of volumes or difficult documents, to near zero curvature. Moreover, this system facilitates the rotation of the spine of volumes being filmed. The bulk of the volume weight being supported by the air containers, the spine of the volume has less friction on the supporting table and more freely rotates as the weight shifts. This system introduces a novel coupling of the transparent cover to a base which permits adjustment of the transparent cover by elevating or lowering it, at its level plane, to meet the needs presented by thick or thin volumes or other documents and a means to raise and lower said cover to turn or adjust pages being filmed.

Genesis for the invention grew out of the obvious and highly visible need evidenced in widespread microfilming operations. The subject of this petition is a refinement of several attempts to accomplish the objective. The original concept involved hydraulics, worm drive gears and small reversible direct current motors. These approaches were abondoned for various reasons, such as danger of damage to the documents being filmed, or as being impractical.

The system now presented is novel, simple in its operation, cost effective and easy to manufacture. Having been reduced to practice, it has been tested intensively and found to be functional as well as practical.

While the industry has long been in need of a device for leveling material being photocopied or microfilmed, the invention here presented was slow to reach fruition.

Diligent search of existing art does not disclose pneumatics being used for the specific purpose proposed herein. While the indentical inventive concept was not found, U.S. Pat. Nos. 4,035,077; 3,995,955; 3,679,302; 3,630,612; 3,352,222; 2,591,449; 1,780,701; 1,612,832; 978,719; 759,469 and 679,740 were critically examined. The concepts therein utilize springs, mechanical pressure, leverage and air cushions in the print making process as distinguished from the photographic or microfilming operations. Only one, Patent No. 3,679,302, refers to but makes no specific claim for the use of a pneumatic system. Moreover, that application does not detail its operation and represents a simple and incomplete function of such a system.

SUMMARY OF THE INVENTION

This invention addresses two problems that face the microfilm operator or one engaged in photographic copying or reproduction. Those problems are: (1) The need for the surface being filmed to be at a level plane. (2) Zero curvature of books or volumes being filmed in an open position.

A solution to these problems is here offered and that objective is accomplished by using air as the leveling agent and a transparent cover, for the material being filmed, with a flexible coupling attached to a base separate from the camera, tripod or pedastal.

A book or volume being filmed is placed on the document table between two inflatable or collapsible air containers with equal mass and size that may be completely concealed under the covers of such volume. The volume is opened with one volume cover resting on one air container and the other volume cover on the other air container. Air is induced into either or both containers in sufficient amounts to bring both sides of the volume to the desired horizontal or level plane. The air source for this process may be developed by a hand or foot operated aspirator or other low pressure system. Air flow to, in, out of, or from the air containers is directed by appropriate low pressure valves and small diameter hose.

The air volume within the air containers may be controlled at the point of input to each container by either inducing more air or by exhausting air to meet the immediate need in order to achieve the level or horizontal plane. Further control of the air volume and leveling process is accomplished by the automatic passage of air from one air container to the other by means of a by-pass tube with a regulation valve to control the amount and flow of air thru that tube as the volume being filmed shifts its weight as pages are turned during filming. The input exhaust and by-pass valves are mounted on a panel in a position convenient to the operation.

As the pages are filmed and turned, creating an inverse weight shift, a reciprocal displacement of air takes place by passage from one air container thru the by-pass valve into the opposite air container, creating an automatic leveling effect.

A high quality transparent material, framed and of a size to cover the material being filmed, is coupled to a base that is separate from the camera, document table, tripod or pedastal. The base is designed to hold a portion of the detachable and adjustable coupling attached thereto. Adjustment of the coupling permits the transparent cover to be elevated or lowered at its level plane to match the thickness of the object being filmed. Also when attached the coupling will function as a hinge at the rear of said cover permitting it to be raised or lowered at the front edge to turn pages for filming. The coupling may consist of: (1) A self-adhesive and easily separated substance of flexible tape material with opposite faces thereof interengagable mating surfaces one part of which is placed on the base in a vertical placement. The matching portion of such material is affixed to the transparent cover in a position to match the verticle placement, permitting a hinged effect when coupled to the base. (2) A magnetic coupling which attaches to a metal facing in a vertical placement on the front of the base. The magnets are hinged to the transparent cover in a position to match the metal facing permitting a hinged effect when coupled to the base.

Once in place with material being filmed and the transparent cover properly oriented, filming is accomplished by raising and lowering the transparent cover on the coupling/hinge to turn pages in the photographic process. Thus, the material being filmed is maintained at a level plane with near zero curvature. The coupling is designed for easy separation and raising or lowering said cover to match the surface and thickness of material being filmed.

BRIEF DESCRIPTION OF THE DRAWINGS

In the accompanying drawings herein like reference characters indicate corresponding parts throughout the several views. The camera is not shown.

DETAILED DESCRIPTION OF THE DRAWINGS

Figure 1:
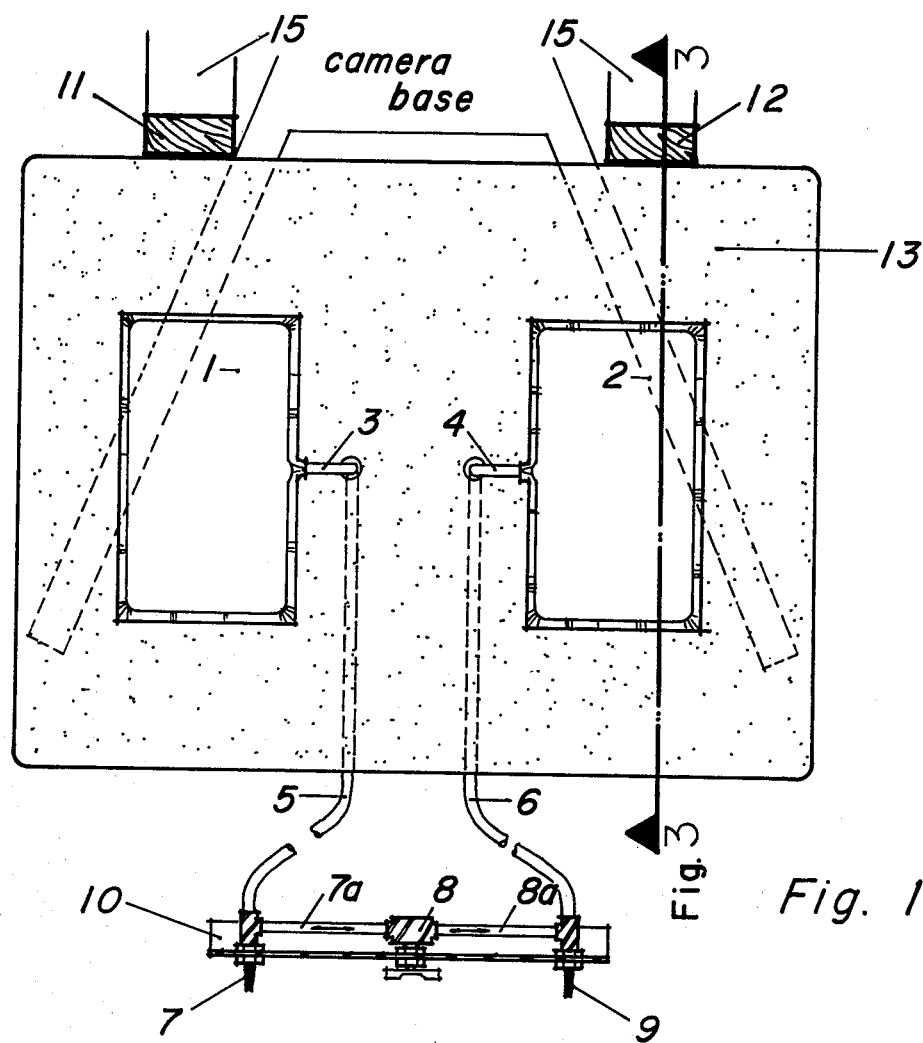
FIG. 1 is a perspective view of the embodiment of the air displacement system of the subject invention.
Figure 2:
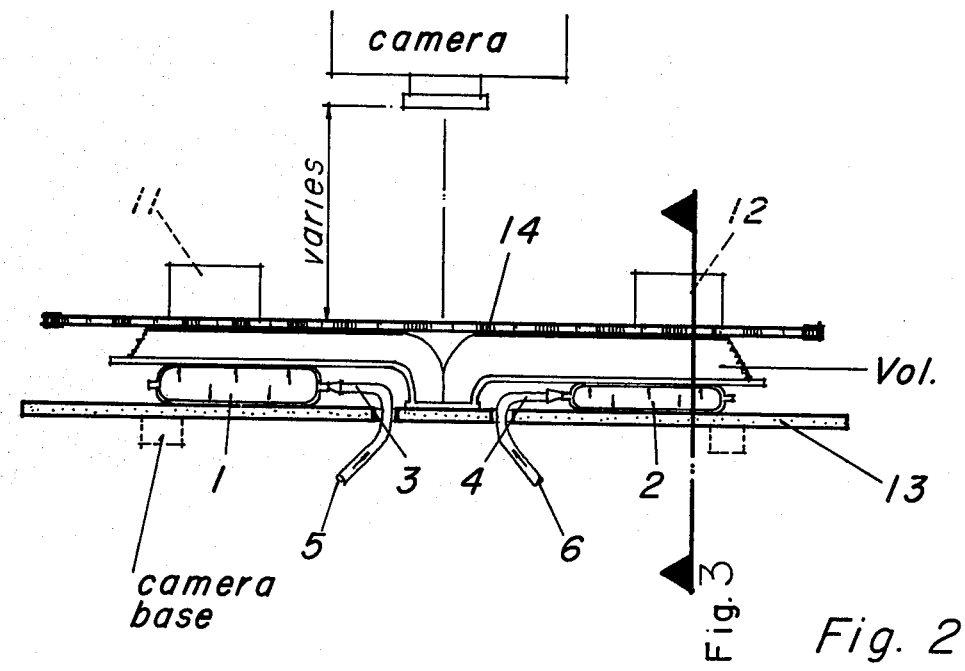
FIG. 2 is a front view giving perspective to the components in place as they may appear in actual operation.
Figure 3:
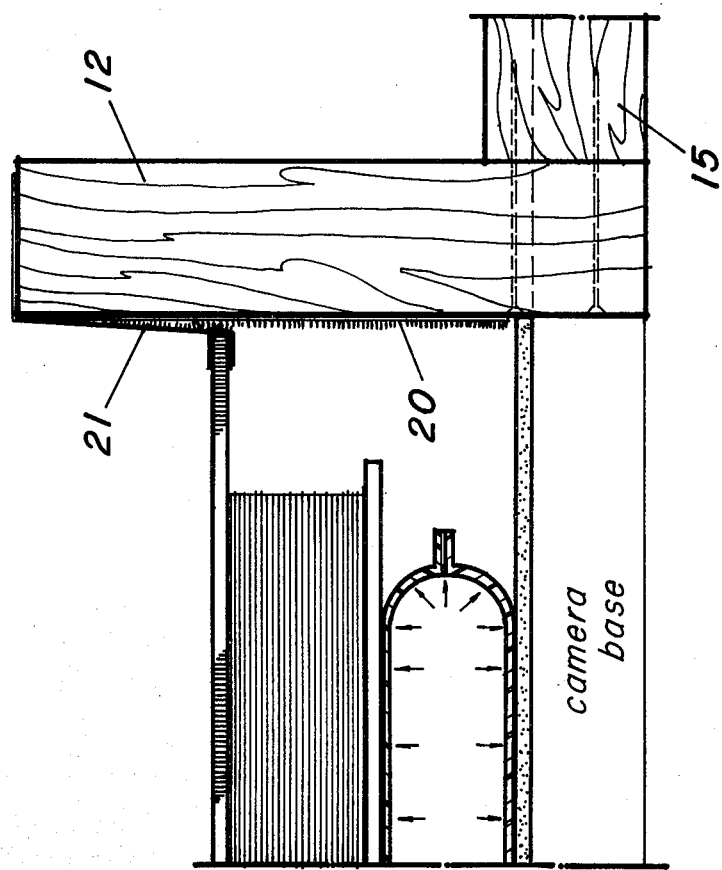
FIG. 3 is a cross sectional side view perspective showing the base to which the transparent cover is coupled in this invention.
Figure 3:
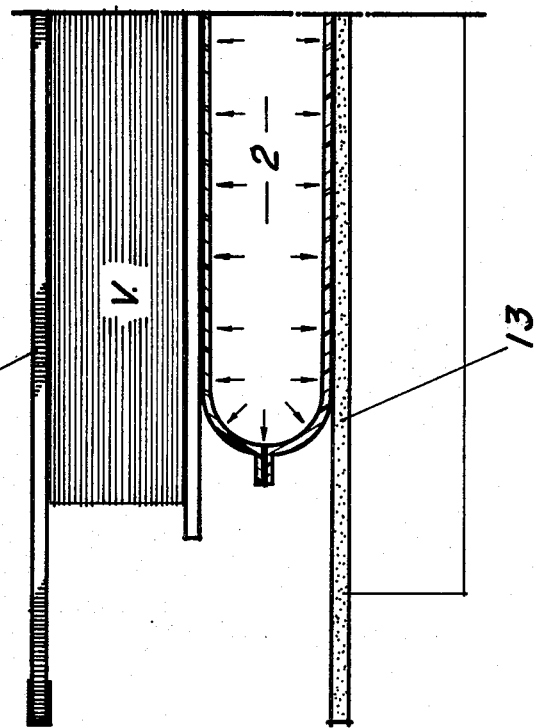

Referring to FIG. 1 a sectional bar will be noted which in turn refers to FIG. 3 where a cross sectional view of this embodiment may be examined in detail. Shown here is a perspective display of the air support system for volumes or books being filmed: 1 and 2 are air containers capable of being inflated or collapsed by induction or exhausting of air thru valves 7 and 9. The volume (Vol. FIG. 2) being filmed is placed on ducument table 13 between air containers 1 and 2 with one cover resting on air container 1 and the other cover on air container 2. Air is then induced into either or both air containers thru intake and exhaust valves 7 and 9 and ducts 3 and 4 by means of a hand operated aspirator, foot pump or other low pressure means to provide the needed air to raise one or both covers of the volume (Vol.) being filmed to the level or horizontal plane. Air is further controlled by its regulation and passage thru hose 7a, valve 8 and hose 8a whereby the air mass in containers 1 and 2 is displaced from one container to the other thru the inverse shift of weight as pages are turned in the photographic process. Valve 8 may be opened or closed to either restrict or accelerate air passage between air containers 1 and 2. Because the major portion of the weight of a volume rests on the air containers, the rotation of the spine of the volume is facilitated as the weight shifts. The weight shift also results in an automatic leveling of the surface of the volume as the pages turn, the spine rotates and the air displacement occurs. Air is directed to, from, in and out of the air containers by small low pressure hose 5, 6, 7a, 8a, and ducts 3 and 4. Valves 7, 8, and 9 are mounted on panel 10 together with connecting hoses and located where they are readily available to the operator.

FIG. 2 also contains the section bar shown in FIG. 1 and relates to FIG. 3. FIG. 2 is a perspective view of the embodiment as it may appear with a volume, (Vol.) in place for filming on document table 13 with the front and back covers resting between and on air containers 1 and 2. Air ducts 3 and 4 provide ingress and egress of air thru low pressure hose 5 and 6 which also permits passage of air thru control valve 8 thru low pressure hose 7a and 8a as described under FIG. 1, thus permitting air displacement as volume weight shifts from air containers 1 and 2 resulting in the automatic leveling of the volume as pages are turned in the filming process. A transparent cover is shown as an adjunct to the embodiment and is used to enhance the leveling and zero curvature of the volume, providing a "Photo Graphic-Plane" suitable for quality production. Transparent cover 14 is raised on the hinged rear of said cover to facilitate the turning of pages and lowered onto the surface being photographed. Hence, the surface is then camera ready. Section bar refers to detailed cross section in FIG. 3.

Referring to FIG. 3 which is a cross sectional and side view of embodiment with the volume (V.) in place and as illustrated in FIG. 2. This perspective details a fabric coupling means giving a hinge capability to the transparent cover 14, thus permitting said cover to be raised and lowered as described above. Item 21 may be but is not limited to a coupler/hinge means comprising an elongated flexible tape having on opposite faces thereof interengagable mating surfaces including a first surface (21) provided with a multitude of small outwardly projecting loops made of stiff filamentary material and a second surface (20) having multiplicity of curly filimentary members releasably interengagable with said loops, operative portions of said surfaces being displaced from one another longitudinally of the tape and providing the coupler/hinge means when meshed. Item 21 being securely fastened to transparent cover 14 at points matching upright portions 11 and 12 of base 15 which is faced permanently with 20 and when 20 and 21 are meshed they become the coupler/hinge as further illustrated in FIGS. 4 and 6.

Figure 4:
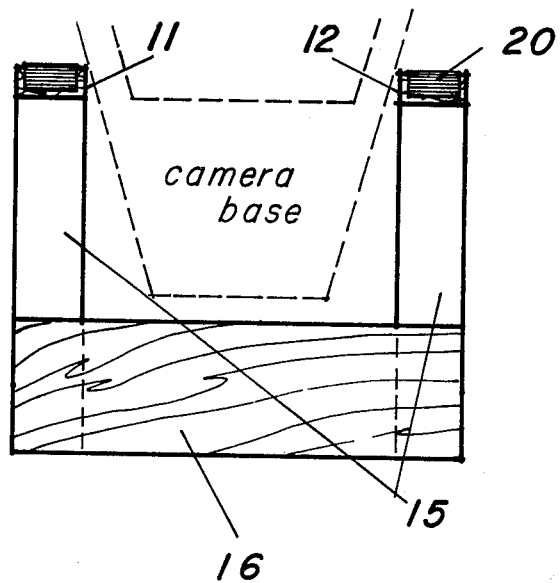
FIG. 4 details the base (top perspective view) to which the transparent cover is coupled by means of the fabric or magnetic means.
Figure 5:
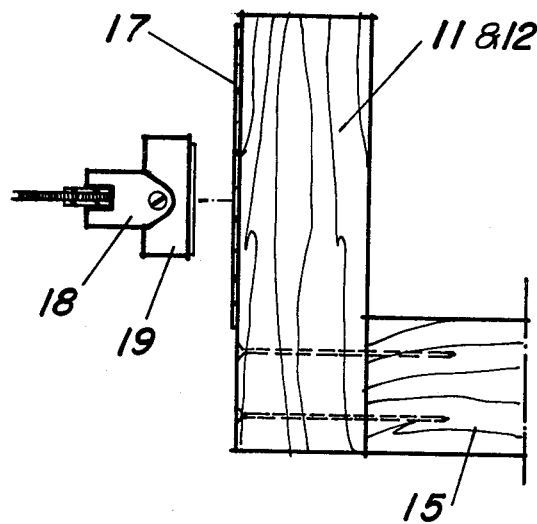
FIGS. 5 & 6 is a possible embodiment of the coupling system thru the fabric or magnetic means here presented.

Another and desirable means of coupling cover 14 to base 15 is by the utilization of magnetic force generated by 19 FIG. 5, a magnet of sufficient force which in turn is connected to linkage 18 which is affixed to cover 14 at two points so arranged to match upright members 11 and 12 which, in this embodiment have metal facings 17 (see FIG. 5) to accommodate two magnets 19 at the two locations affixed to cover 14. Coupling means 19-17 and 21-20 in FIGS. 3, 4, 5 and 6 connect or disconnect cover 14 quickly and conveniently. The couplings 19-17 and 21-20 are of necessity capable of being raised or lowered at a level plane to accommodate the varied thickness of material being filmed.

Figure 6:
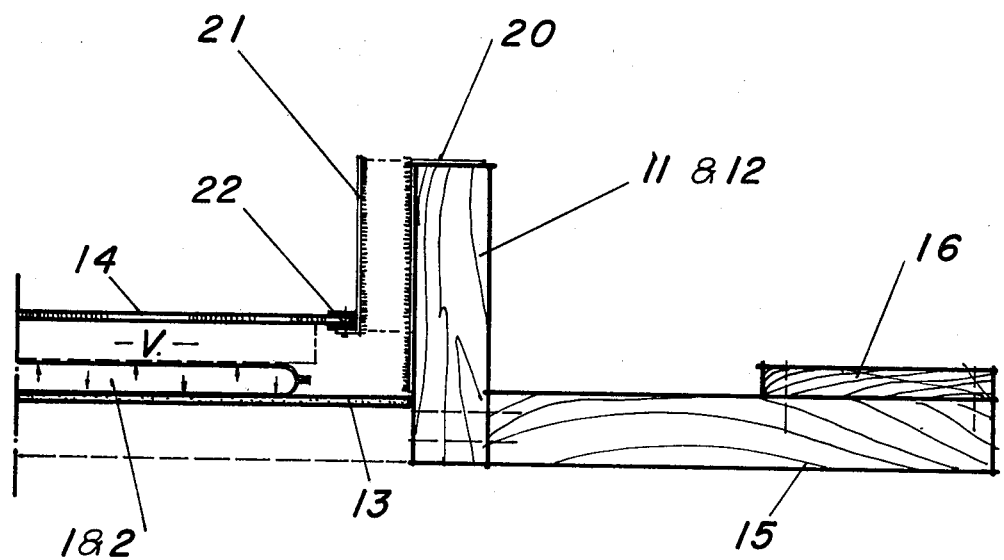

Refer now to FIGS. 4, 5 and 6 which disclose two embodiments designed to support cover 14 thru coupling 20-21 FIGS. 3, 4 and 6 or coupling 17-19 shown in FIG. 5: The placement of base 15 as shown in FIG. 4 is so arranged that it is separate and apart from the camera (not shown) pedastal, tripod or document table 13 to avoid movement that may disturb camera stability. FIG. 4 also discloses cross member 16 of base 15 designed to hold the verticle members 11 and 12 of base 15 in position. Cross member 16 of base 15 is also used to hold added weight or ballast to prevent movement as cover 14 is raised and lowered in the photographic process. FIG. 5 details the magnetic coupling 17-19 while FIG. 6 details the flexible tape coupler/hinge means described under FIG. 3 above and designated as 20 and 21 in that illustration.

The applicant herein claims:

1. A pneumatic system for raising or lowering material such as books, volumes or documents and other materials being photographed or microfilmed at a level plane including side-by-side disposed inflatable and deflatable air containers to elevate and lower respective book-half subject matter disposed thereover and being filmed, a transparent cover disposed over said air container, and a system of air-communication means to facilitate and control the passage of air thru inflation or deflation in, out of or thru said system to accomplish the leveling objective.

2. A pneumatic system for raising or lowering material such as books, volumes or documents and other materials being photographed or microfilmed at a level plane including side-by-side disposed inflatable and deflatable air containers to elevate and lower respective book-half subject matter disposed thereover and being filmed, a transparent cover disposed over said air container, and a system of air-communication means to facilitate and control the passage of air thru inflation or deflation in, out of or thru said system to accomplish the leveling objective, and wherein said system includes a coupler/hinge providing means for raising and lowering a transparent cover at its rearward point to facilitate adjustment of material being filmed, said coupler/hinge comprising an elongated, dual part, self-adhesive tape having on opposite faces thereof interengagable mating surfaces, said mating surfaces being releasably engaged longitudinally of the tape whereby to provide means for convenient connection and release of said cover, to raise and lower said cover at its level plane in conformance with said material being filmed, whereby to reduce to curvature as said cover presses downwardly upon said material by gravitational force.

3. A system as claimed in claim 2, wherein said system is provided with a base having an upright member so disposed with said elongated, dual part, self-adhesive flexible tape whereby to complete the coupling of the said transparent cover to said base, said base being so designed to support the transparent cover without direct or physical contact with any exterior camera, pedestal, tripod or document table.

4. A pneumatic system for raising or lowering material such as books, volumes or documents and other materials being photographed or microfilmed at a level plane including side-by-side disposed inflatable and deflatable air containers to elevate and lower respective book-half subject matter disposed thereover and being filmed, a transparent cover disposed over said air container, and a system of air-communication means to facilitate and control the passage of air thru inflation or deflation in, out of or thru said system to accomplish the leveling objective, and wherein said system includes a magnetic coupler/hinge device and a base with upright members disposed with metal facings, said cover having magnetic means, said metal facings providing means to complete the coupling of said transparent cover to said base by magnetic force provided by said magnetic means, said system being so designed to support said transparent cover without direct or physical contact with the camera, pedestal, tripod or document table.

* * * * *